Nov. 5, 1940.    B. J. FARWIG    2,220,069
MEANS FOR HANDLING UTENSILS AND THE LIKE
Filed Nov. 19, 1938
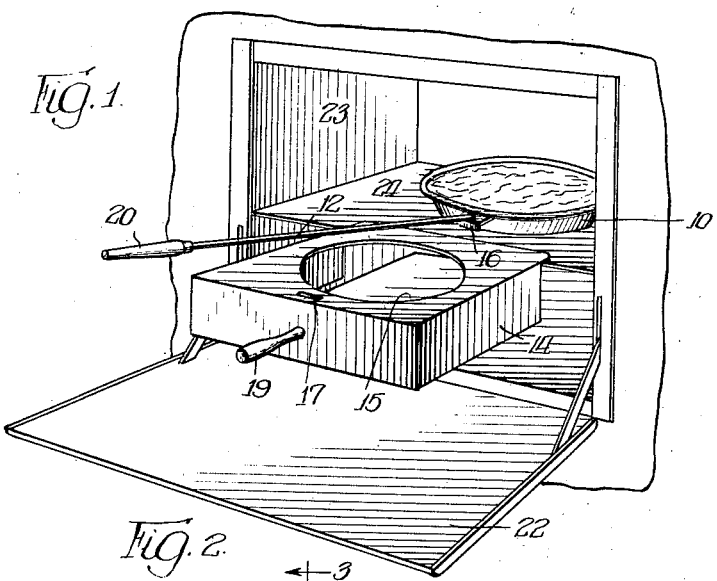
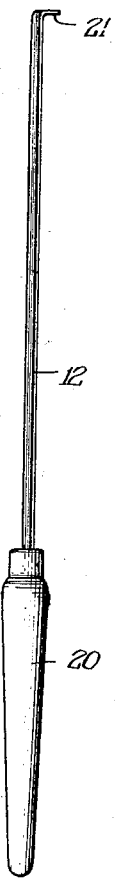
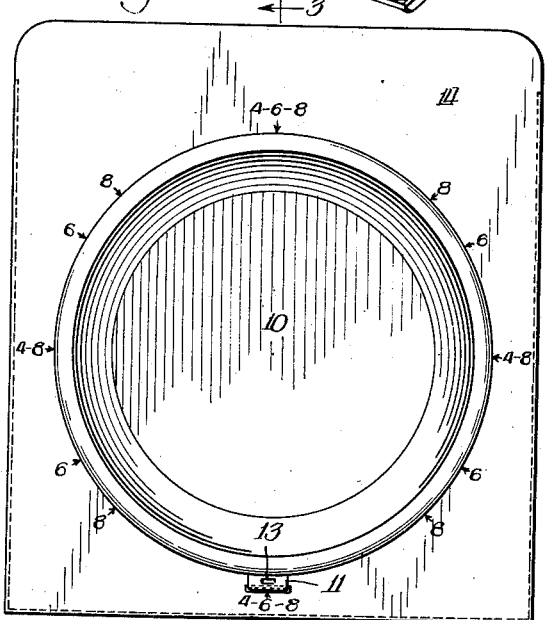
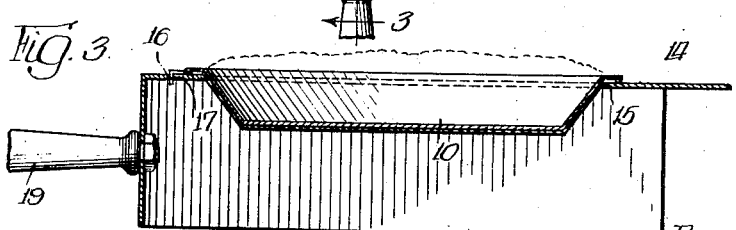
INVENTOR.
Bernard J. Farwig,
BY
ATTORNEY.

Patented Nov. 5, 1940

2,220,069

UNITED STATES PATENT OFFICE 2,220,069

MEANS FOR HANDLING UTENSILS AND THE LIKE

Bernard J. Farwig, Chicago, Ill.

Application November 19, 1938, Serial No. 241,336

3 Claims. (Cl. 53—6)

Cooking utensils, such as pie pans, skillets, baking pans of all kinds, and well known similar articles, have, in the past, been placed in and removed from ovens, or other portions of stoves and the like, by the housewife with the use of a rag or rags, and a fork or other crude means of handling, which frequently has resulted in serious burns to the person, and sometimes spilling or dropping the utensil and its contents. Also, in the past, placing the utensil bearing hot contents on the table or shelf has resulted in ruining the paint or finish of the table or shelf, or the covering thereon.

To overcome these and other objectionable features, I have provided a simple arrangement which will enable anyone to handle utensils such as those abovementioned, with ease and safety.

It is a purpose of the present invention to provide an arrangement whereby utensils that are hot, or that are used in such highly heated places as ovens and must be placed therein and removed therefrom, may be handled with ease and without danger of burns to the person handling them.

It is an object to provide means for handling such utensils that may be used to support said utensils on a table or shelf or other place in a manner which will eliminate contact of the utensil with said table or shelf, and consequently will eliminate heat ruining said table.

Other objects and advantages of the invention will appear as the nature of the improvements is better understood, the invention consisting substantially in the novel construction, combination and arrangement of parts hereinafter fully described, illustrated in the accompanying drawing, and finally pointed out in the appended claims.

In the drawing:

Figure 1 is a perspective view of applicant's device in operating position for the removal of the cooking utensil from an oven;

Figure 2 is a plan view showing the cooking utensil holder with the utensil in place;

Figure 3 is a side elevation of the device of Figure 2; taken on the line 3—3 of Figure 2, looking in the direction of the arrows, Figure 3 showing a modification in that the cut-out portion as shown in Figure 1, has been replaced with a depressed portion; and Figure 4 shows the hook bar, used for moving the cooking utensil into engagement with the support.

Referring more in detail to the construction shown in the various figures; 10 represents a cooking utensil such as a pie pan or the like. For the purpose of this application, the cooking utensil is shown as a pie pan and will be referred to as such, but it is to be understood that any cooking utensil is to come within the scope of this application, whether shaped like a pie pan, square, round or otherwise.

The pie pan 10 has an extended portion 11. This extension may be stamped out of the material forming the pie pan at the time the latter is made, or it may be spot welded thereto or otherwise made thereon. If desirable, the rim or other portion of the pan itself may be formed so that the extension may be eliminated.

The extension is provided with means whereby a hooking bar 12 may be attached, which means are shown in the form of a slot or the like 13. An upright post or other similar means might be employed but it is believed the slot gives better control in moving the pan to various positions of the oven and into the holder 14.

This holder 14 is provided with a depressed or cut-out portion 15 into which the pie pan 10 fits when in position. For the purpose of holding the pie pan securely against sidewise movement when cutting the pie, the extension 11 is bent over at the end to form a vertical portion 16. This vertical portion 16 fits into a centering slot 17 when the pie pan has been removed from the oven and is in position on the holder 14.

For the purpose of assisting in slicing the contents of the pie pan, it is desirable to indicate the relative circumferential places the slicing should be started. For this purpose numerals are provided around the margin of the cooking utensil but placed on the holder. These numerals indicate the size of the slices; that is, if it is desired to slice the contents into fourths then the number 4 shows the relative position the knife should be placed in making the slices. If eighths are desired, then the number 8 indicates the relative position for placing the knife.

Other numerals may be used but these are given by way of illustration. It is understood of course that where other numerals are used they will have different locations. These numerals are usually supported by arrows pointing the direction of the slice, and both the numerals and the arrows may be stamped, painted or otherwise affixed to the holder 14. 14 has a handle 19 which assures a good grip without burning the hand. The hook bar 12 is likewise provided with a handle, which is number 20, and the hook portion 21.

It is understood that the support 14 need not be quite so elaborate as that shown.

Numbers 22, 23 and 24 represent obvious and well-known portions of an ordinary oven, being respectively, the walls, the door and the supporting shelves. They do not form a portion of this invention but are shown to indicate the operation of the device.

It will be obvious from examination of the drawing that a pie pan is placed on the shelf 24 in the oven. The hook bar 12 has the point 21 inserted in the slot of the extension and the pan is removed into the oven to a desired position.

When the cooking is consummated and it is desired to remove the hot pan and its contents, the portion 21 of the hook bar 12 is again inserted in the slot of the extension, and the support 14 is moved into the portion shown in Figure 1. The pie pan is then pulled out of the oven on to the support and into the opening 15. The bent portion 16 of the extension moves into the slot 17 of the support, and the pie pan is in position so that the support can be moved to the table, shelf, or other desired portion, after which slicing of the pie is a simple matter.

For the slicing it is merely necessary to place the point of the knife adjacent a figure indicating the number of slices and moving in the direction indicated by the arrows to the center of the pan.

As will be seen, safe, easy arrangement is provided for handling hot cooking utensils. All of the materials are of inexpensive construction and the device lends itself admirably to stamping machines and other quantity methods of manufacture for cheapness and good quality.

It may be well to point out that the hook bar is made of flat or angular material in the preferred form, for the reason that it fills the opening of the slot on the extension and manipulation of the hook bar locates the utensil wherever desired in the oven without it turning on the hook bar as an axis, which might place the extension on the off side of the utensil for easy contact for removal from the oven.

The form of the invention herein shown and described presents a preferred embodiment thereof, and delineates its adaption to practical use, but it is to be understood that the present disclosure is to be considered from the illustrative standpoint and not as imposing restriction or limitation on the invention.

While I have herein shown and described certain features of my invention, still I do not wish to limit myself thereto, except as I may do so in the claims.

I claim:

1. Means for handling hot cooking utensils comprising in combination a support having a cut-out portion receiving the cooking utensil, a slot in said support, handle means for said support, a cooking utensil fitting the cut-out portion of said support, an extension on said cooking utensil, said extension being bent downwardly at the end thereof, a slot in said extension, a hook bar having a handle and hooking portion, said hooking portion engaging the slot in the extension of said utensil, and operative to move said utensil to said opening on said support and said vertical bent-over portion of said extension fitting into said slot on said support and holding said utensil against slipping while on said support substantially as described.

2. Means for handling hot cooking utensils comprising in combination a support having a cut-out portion receiving the cooking utensil, handle means for said support, a cooking utensil supported in the cut-out portion of said support, an extension on said cooking utensil, a slot in said extension, a hook bar having a handle and hooking portion, said hooking portion engaging the slot in the extension of said utensil, and operative to move said utensil to said opening on said support and said vertical bent-over portion of said extension fitting into said slot on said support and holding said utensil against slipping while on said support substantially as described.

3. Means for handling a hot cooking utensil comprising in combination a hooking bar with a hooking portion and handle means, a cooking utensil having slot means engageable by said hooking means of said hooking bar, a support adapted to hold said cooking utensil, said support having a depressed portion receiving and retaining the hot cooking utensil, and having handle means by which said support and the cooking utensil are moved from place to place as desired.

BERNARD J. FARWIG.